US010931526B1

(12) United States Patent
Jiang et al.

(10) Patent No.: US 10,931,526 B1
(45) Date of Patent: *Feb. 23, 2021

(54) VIRTUALIZED NETWORK FUNCTION DESCRIPTORS FOR VIRTUALIZED NETWORK FUNCTION CONFIGURATION

(71) Applicant: Juniper Networks, Inc., Sunnyvale, CA (US)

(72) Inventors: Tong Jiang, Fremont, CA (US); Roshan Joyce, Bangalore (IN); Gopi Krishna, Saratoga, CA (US); Sankar Ramamoorthi, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/672,778

(22) Filed: Nov. 4, 2019

Related U.S. Application Data

(63) Continuation of application No. 15/473,369, filed on Mar. 29, 2017, now Pat. No. 10,469,317.

(51) Int. Cl.
*H04L 12/24* (2006.01)
*G06F 9/455* (2018.01)
*H04L 12/46* (2006.01)

(52) U.S. Cl.
CPC ........ *H04L 41/082* (2013.01); *G06F 9/45504* (2013.01); *H04L 12/4641* (2013.01)

(58) Field of Classification Search
CPC ............... H04L 41/082; H04L 12/4641; G06F 9/45504
See application file for complete search history.

(56) References Cited

U.S. PATENT DOCUMENTS

| 9,813,335 | B2* | 11/2017 | Felstaine ............... H04L 63/083 |
| 9,847,915 | B2* | 12/2017 | Ashwood-Smith ..... H04L 41/18 |
| 9,979,602 | B1* | 5/2018 | Chinnakannan ........ H04L 47/82 |
| 2014/0201374 | A1 | 7/2014 | Ashwood-Smith et al. |

(Continued)

OTHER PUBLICATIONS

"Architecture for Technology Transformation—Service Providers Leverage SDN/NFV to Empower Change," Juniper Networks, Inc., May 2016, 11 pp.

(Continued)

*Primary Examiner* — Daniel C. Murray
(74) *Attorney, Agent, or Firm* — Shumaker & Sieffert, P.A.

(57) ABSTRACT

Techniques are described for dynamically adapting virtualized network functions (VNFs) to different target environments. A controller stores device profiles that include configuration data and workflows for resolving configuration parameters for instantiating and deploying a VNF package to form a network service. To support the resolution of VNF configuration parameters, a VNF descriptor for the VNF is extended to include a device family parameter that indicates a shared architecture and configuration parameters. The controller, when instantiating the VNF, may identify a device profile usable for resolving the configuration parameters for the VNF and obtain configuration data from the device profile for creating and configuring a VNF instance for the VNF descriptor. Extending the VNF descriptor to specify a device family allows the VNF to be flexibly adapted for different target environments and may avoid the use of numerous pre-defined VNF descriptors.

20 Claims, 8 Drawing Sheets

(56) References Cited

U.S. PATENT DOCUMENTS

| | | |
|---|---|---|
| 2014/0376555 A1 | 12/2014 | Choi et al. |
| 2015/0326448 A1 | 11/2015 | Chaudhary et al. |
| 2015/0326451 A1 | 11/2015 | Rao et al. |
| 2015/0326535 A1 | 11/2015 | Rao et al. |
| 2016/0352582 A1 | 12/2016 | Itsumi |
| 2016/0352634 A1 | 12/2016 | Itsumi |
| 2017/0078216 A1 | 3/2017 | Adolph et al. |
| 2017/0187607 A1 | 6/2017 | Shaikh et al. |
| 2017/0187686 A1 | 6/2017 | Shaikh et al. |
| 2017/0192811 A1 | 7/2017 | Kiess et al. |
| 2017/0329639 A1 | 11/2017 | Morper et al. |
| 2018/0077020 A1 | 3/2018 | Li et al. |
| 2018/0316578 A1 | 11/2018 | Shen et al. |

OTHER PUBLICATIONS

"Contrail Service Orchestration," Juniper Networks, Inc., Oct. 2016, 4 pp.

"Juniper Networks MetaFabric Architecture—Enabling a Simple, Open, and Smart Data Center," Juniper Networks, Inc., Jul. 2015, 8 pp.

"Network Automation and Orchestration—Building an Agile Data Center Infrastructure with Juniper Networks," Juniper Networks, Inc., Oct. 2015, 8 pp.

"ETSI GS NFV 002 V1.1.1 Network Functions Virtualisation (NFV); Architectural Framework," ETSI Industry Specification Group (ISG), Oct. 2013, 21 pp.

"Network Functions Virtualisation—White Paper #3—Network Operator Perspectives on Industry Progress," SDN & OpenFlow World Congress, Oct. 14-17, 2014, 20 pp.

"ETSI GS NFV-INF 001 V1.1.1 Network Functions Virtualisation (NFV); Infrastructure Overview," ETSI Industry Specification Group (ISG), Jan. 2015, 59 pp.

"ETSI GS NFV-MAN 001 V1.1.1 Network Functions Visstualisation (NFV); Management and Orchestration," ETSI Industry Specification Group (ISG), Dec. 2014, 184 pp.

\* cited by examiner

VIRTUALIZED NETWORK FUNCTION DESCRIPTORS FOR VIRTUALIZED NETWORK FUNCTION CONFIGURATION

This application is a continuation of U.S. application Ser. No. 15/473,369, filed on Mar. 29, 2017, the entire content of which is incorporated herein by reference.

TECHNICAL FIELD

The disclosure relates to computer networks and, more specifically, to applying network services to data traffic traversing computer networks.

BACKGROUND

Software-defined networking (SDN) and Network Functions Virtualization (NFV) have revolutionized the traditional communication network architectures and have transformed the way communication service providers (CSPs) design their network infrastructure and services. NFV is a network architecture concept that virtualizes classes of network functions into building blocks that can be connected, or chained together, to create communication services.

The initial interest in introducing SDN and NFV into communication services has been driven by the desire to lower capital costs by replacing dedicated network hardware with generic computing platforms, and to lower operating costs by leveraging cloud automation tools. As the revolution has progressed, focus has shifted toward a foundational transformation in managed communication services, a migration toward a telecommunication (telco) cloud, and the emergence of distributed virtualized infrastructures.

Typical NFV implementations include multiple virtualized network functions (VNFs). A network operator, for example, may deploy NFV Infrastructure (NFVI) in the form of one or more computing devices to apply, to data traffic traversing a computer network, network functions such as firewall, carrier grade network address translation (CG-NAT), performance enhancement proxies for video, transport control protocol (TCP) optimization and header enrichment, caching, and load balancing. Each of these network functions may be performed by a virtualized network function, which may be executed by one or more virtual machines, containers, or other execution environment of the NFV Infrastructure. In this way, virtualized network functions may be executed by servers, switches, storage devices, and cloud computing infrastructure, instead of having custom hardware appliances for each network function.

SUMMARY

In general, techniques are described for dynamically adapting virtualized network functions (VNFs) to different target virtualized infrastructure manager (VIM) and network function virtualization (NFV) infrastructure (NFVI). A VNF package being deployed to NFVI by a VIM may require configurations that are VIM-specific, for instance, where different types of VIMs abstract different NFVI architectures. In some examples, a controller stores device profiles that each includes configuration data and/or defines a workflow for resolving configuration parameters for instantiating and deploying the VNF package as a VNF instance to form a part of a network service.

To request a network service that includes a VNF to be adapted by dynamically resolving configuration parameters, the VNF descriptor for the VNF may be extended to include a device family parameter having a value set to indicate that the VNF has a common architecture with configuration parameters in common with one or more VNFs including the VNF. The controller, when instantiating the network service, may determine a device profile usable for resolving the configuration parameters for the VNF by keying the device family parameter value of the VNF descriptor to one of the device profiles. In some examples, the controller keys both the device family parameter value of the VNF descriptor and a VIM-type value to one of the device profiles, where the VIM-type specifies the type of NFVI the VIM abstracts and to which the corresponding VNF is to be deployed. The controller obtains configuration data from the identified device profile and uses the configuration data to create and configure a VNF instance for the VNF descriptor to operate as part of the requested network service.

The techniques may provide one or more advantages. For example, controller orchestration may leverage the techniques to use a common VNF package in diverse VIM platforms to enable seamless integration and orchestration across NFV infrastructures. Extending the VNF descriptor to specify a device family for the described VNF to flexibly adapt the VNF to different target VIMs and deployment environments may avoid the proliferation and concomitant administrative difficulty of VNF packages and of pre-defining VNF descriptors with such configuration data as is needed for instantiating the corresponding VNFs.

In one example, the disclosure describes a method including: receiving, by at least one controller device for a network function virtualization infrastructure, a network service descriptor (NSD) for a network service, the NSD including a virtualized network function descriptor (VNFD) that describes a virtualized network function (VNF), the VNFD including data that indicates a device family for the VNF; obtaining, by the at least one controller device based on the VNFD, an executable package for the VNF; obtaining, by the at least one controller device and based on the device family for the VNF, configuration data for the executable package for the VNF; and configuring, by the at least one controller device and based on the configuration data, an instance of the executable package for the VNF to execute by the network function virtualization infrastructure as part of the network service.

In another example, the disclosure describes at least one controller device for a network function virtualization infrastructure, the at least one controller device including one or more processors operably coupled to a memory and configured to: receive a network service descriptor (NSD) for a network service, the NSD including a virtualized network function descriptor (VNFD) that describes a virtualized network function (VNF), the VNFD including data that indicates a device family for the VNF; obtain, based on the VNFD, an executable package for the VNF; obtain, based on the device family for the VNF, configuration data for the executable package for the VNF; and configure, based on the configuration data, an instance of the executable package for the VNF to execute by the network function virtualization infrastructure as part of the network service.

In another example, the disclosure describes a non-transitory computer-readable storage medium including instructions that, when executed, cause at least one controller device for a network function virtualization infrastructure to: receive a network service descriptor (NSD) for a network service, the NSD including a virtualized network function descriptor (VNFD) that describes a virtualized network function (VNF), the VNFD including data that indicates a device family for the VNF; obtain, based on the VNFD, an executable package for the VNF; obtain, based on the device family for the VNF, configuration data for the executable package for the VNF; and configure, based on the configuration data, an instance of the executable package for the VNF to execute by the network function virtualization infrastructure as part of the network service.

BRIEF DESCRIPTION OF DRAWINGS

Like reference characters refer to like elements throughout the figures and description.

DETAILED DESCRIPTION

Figure 1:
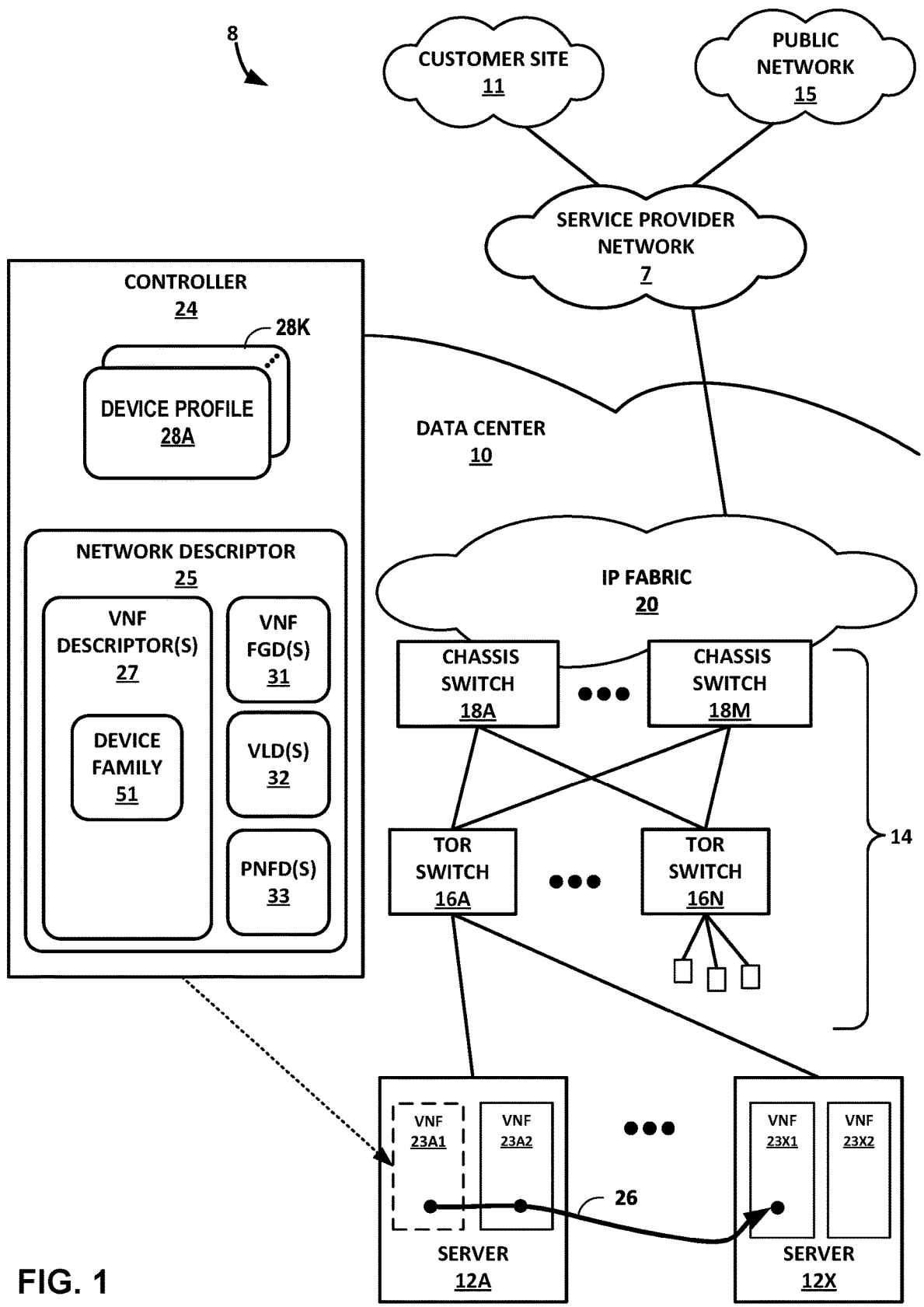
FIG. 1 is a block diagram illustrating an example network system having a data center in which examples of the techniques described herein may be implemented.

FIG. 1 is a block diagram illustrating an example network system 8 having a data center 10 in which examples of the techniques described herein may be implemented. In general, data center 10 provides an operating environment for applications and services for a customer having customer site 11 coupled to the data center by service provider network 7. Data center 10 may, for example, host infrastructure equipment, such as networking and storage systems, redundant power supplies, and environmental controls. Service provider network 7 is coupled public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer site 11 and public network 15 are illustrated and described primarily as edge networks of service provider network 7, in some examples, one or more of customer site 11 and public network 15 may be tenant networks within data center 10 or another data center. For example, data center 10 may host multiple tenants (customers) each associated with one or more virtual private networks (VPNs), each of which may implement an example of customer site 11 or VPNs within customer site 11.

Service provider network 7 offers packet-based connectivity to attached customer site 11, data center 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, data center 10 may represent one of many geographically distributed network data centers. As illustrated in the example of FIG. 1, data center 10 may be a facility that provides network services for customers. In a typical network deployment, network services are deployed based on the needs of the customers. As used herein, each "network service" is typically implemented as a service chain of individual network functions that each perform a different operation on a packet flow. That is, an overall "network service" is implemented as a "service chain" or "network service chain" of a set of service nodes, each service node operating to provide a different virtualized network function (VNF). In this way, the service chain of VNFs applies the set of network functions in a particular order to provide an overall (composite) network service to packet flows bound to the service chain.

A customer of the service provider may be a collective entity such as enterprises and governments or individuals. For example, a network data center may host web services for several enterprises and end users. Other exemplary services may include data storage, virtual private networks, traffic engineering, file service, data mining, scientific- or super-computing, and so on. Although illustrated as a separate edge network of service provider network 7, elements of data center 10 such as one or more physical network functions (PNFs) or virtualized network functions (VNFs) may be included within the service provider network 7 core.

In this example, data center 10 includes storage and/or compute servers interconnected via high-speed switch fabric 14 provided by one or more tiers of physical network switches and routers, with servers 12A-12X (herein, "servers 12") depicted as coupled to top-of-rack switch 16A. Servers 12 may also be referred to herein as "hosts" or "host devices." Although only servers coupled to TOR switch 16A are shown in detail in FIG. 1, data center 10 may include many additional servers coupled to other TOR switches 16 of the data center 10.

Switch fabric 14 in the illustrated example includes interconnected top-of-rack (TOR) (or other "leaf") switches 16A-16N (collectively, "TOR switches 16") coupled to a distribution layer of chassis (or "spine") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10 may also include one or more physical network functions (PNFs) such as physical firewalls, load balancers, routers, route reflectors, broadband network gateways (BNGs), Evolved Packet Cores or other cellular network elements, and other PNFs.

In this example, TOR switches 16 and chassis switches 18 provide servers 12 with redundant (multi-homed) connectivity to IP fabric 20 and service provider network 7. Chassis switches 18 aggregate traffic flows and provides high-speed connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer site 11 by service provider network 7. The switching architecture of data center 10 is merely an example. Other switching architectures may have more or fewer switching layers, for instance.

Each of virtualized network functions (VNFs) 23 hosted by any of servers 12 is a software implementation of a network function. Whereas a physical network function refers to a dedicated appliance to perform the corresponding network function, a virtualized network function may be deployed for execution to network function virtualization infrastructure (NFVI). In general, NFVI may be any computing environment having computing resources for executing the VNFs. In the example of FIG. 1, VNFs 23 are deployed to NFVI comprising servers 12, which may each represent a compute server, switch, or storage server. For example, each of servers 12 may represent a general-purpose computing device, such as x86 processor-based servers, configured to operate according to techniques described herein.

NFVI may be located in data center 10, network nodes of service provider network 7, and at any of customer site 11. Example VNFs includes virtualized applications such as firewall, carrier grade network address translation (CG-NAT), media optimization (voice/video), WAN optimization, NAT44, NAT64, HTTP header enrichment functions, TCP optimizers, IPSec/VPN services, deep packet inspection (DPI), HTTP filtering, counting, accounting, charging, and load balancing of packet flows, and application-level gateways (ALGs) as well as complex network functions such as Service Gateways, broadband network gateways (BNGs), and Packet Data Network Gateways (PGWs).

Each of VNFs 23 may be implemented using a virtual machine, a container, or other virtualized execution environment that executes the VNF. Server 12A executes two VNFs 23A and server 12X executes two VNFs 23X. However, a server 12 may execute as many VNFs as is practical given hardware resource limitations of the server 12. Each of VNFs 23 may use one or more virtual hardware components to perform packet I/O or otherwise process a packet. For example, a VNF of VNFs 23A may use one virtual hardware component (e.g., an SR-IOV virtual function) enabled by a NIC to perform packet I/O and receive/send packets on one or more communication links with TOR switch 16A.

In general, a virtual machine provides a virtualized/guest operating system for executing applications in an isolated virtual environment. Because a virtual machine is virtualized from physical hardware of the host server, executing applications are isolated from both the hardware of the host and other virtual machines.

An alternative to virtual machines is the virtualized container, such as those provided by the open-source DOCKER Container application. Like a virtual machine, each container is virtualized and may remain isolated from the host machine and other containers. However, unlike a virtual machine, each container may omit an individual operating system and provide only an application suite and application-specific libraries. A container is executed by the host machine as an isolated user-space instance and may share an operating system and common libraries with other containers executing on the host machine. Thus, containers may require less processing power, storage, and network resources than virtual machines. As used herein, containers may also be referred to as virtualization engines, virtual private servers, silos, or jails. In some instances, the techniques described herein with respect to containers and virtual machines or other virtualization components.

The service provider for data center 10 may provision network services that use VNFs executing by servers 12 of data center 10 or other NFVI of service provider network 7, customer site 11, or public network 15. In general, a network service is a forwarding graph of network functions interconnected by supporting network infrastructure. The various network functions can be implemented in multiple different networks, such as data center 10, service provider 7, and customer site 11. The network functions that make up the network service contribute to the overall functionality of the higher-level network service. As such, network service processing operations are a combination of its functional blocks, which can include individual network functions, sets of network functions, network function forwarding graphs, and/or the infrastructure network.

A network function receives packets from one endpoint and outputs the processed packets to another endpoint. Network infrastructure delivers packets classified to a network service between the endpoints and the network functions according to the network function forwarding graph.

A network applies network services to packet flows that may be sourced by/destined to customer site 11 and public network 15. Service provider network 7 may implement a customer virtual private network (VPN), such as a Layer 3 VPN, Ethernet VPN, or Virtual Private LAN Service, to interconnect customer site 11, public network 15, and data center 10. Service provider network 7 may provide interconnection services for many different customers and associated customer sites.

The term "packet flow," "traffic flow," or simply "flow" refers to a set of packets originating from a particular source device and sent to a particular destination device. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Controller 24 manages and orchestrates resources to configure VNFs 23 (and/or other VNFs for service provider network 7) for network services and provision inter-VNF instance connectivity in the network infrastructure. Controller 24 may output configuration data to, e.g., servers 12 to configure the servers to execute VNFs. Controller 24 may include one or more computing devices that execute in a centralized or distributed manner to perform management and orchestration (MANO). Orchestration may include onboarding and coordinating VNFs that in combination instantiate a network service. Additional details regarding NFV MANO is found in "Network Functions Virtualization (NFV); Management and Orchestration," ETSI GS NFV-MAN 001 v1.1.1, European Telecommunications Standards Institute (ETSI), December, 2014, (hereinafter, "NFV MANO") which is incorporated by reference in its entirety.

Controller 24 may obtain network service descriptors for network services and provision the network services in network system 8. A network service descriptor describes the forwarding graph for a network service, including by indicating the constituent network functions (firewall, BNG, etc.) as well as the topology between the network functions of the network service. A network service descriptor may specify connection points, which may acts as endpoints of the network service.

Constituent network functions may specify VNFs, PNFs, or some combination thereof. A network service descriptor may include one or more virtualized network function descriptors, which may each specify, e.g., an identifier, a virtual machine image or other software image for execution to perform the VNF, a vendor, and a version. A virtualized network function descriptor may also include connectivity and interface requirements for the corresponding VNF for establishing connectivity with the VNF.

A network service descriptor may indicate the topology for the network service by referencing VNFs and/or PNFs and links that connect the network functions. For example, a network service descriptor may specify a chain of network functions using a list data structure or other data structure for specifying an ordering of the constituent network functions in which user plane traffic is to be processed by the network service.

The network service descriptor may specify the chain of network functions using an ordered list of connection points forming a chain of network functions (VNFs or PNFs). The connection points may refer to Virtual Link Descriptors (vld), which are deployment templates which describe the resource requirements that are needed for a link between VNFs, PNFs, and endpoints of the Network Service, and which can be met by various link options that are available in the NFVI.

An example network service description is nsd, an example virtualized network function descriptor is vnfd, and an example data structure for indicating a network function topology is vnffgd (VNF Forwarding Graph), which are described in NFV MANO.

In the example of FIG. 1, controller 24 provisions network service 26 for the customer associated with customer site 11 based on a network descriptor 25 for network service 26. Network service 26 may be a customer-specific network service for the customer associated with customer site 11. However, network service 26 is not limited to those associated with the customer associated with customer site 11 and may be any network service having one or more constituent network functions.

Controller 24 may obtain network descriptor 25 for network service 26 from a data center operator 10, the service provider, a customer portal for requesting network services, a network management system. The network service descriptor 25 for network service 26 includes one or more VNFs in an ordering that defines a chain of VNFs to be applied to packets mapped to the network service, where pairs (if any) of VNFs adjacent in the ordering are "intra-network service adjacent VNFs."

Network service descriptor 25 represents a deployment template for network service 26. Network service descriptor 25 references a plurality of other descriptors that describe components that are part of the corresponding network service 26. For example, network service descriptor 25 may include one or more VNF Forwarding Graph Descriptors (VNF FGD) 31, each of which is a deployment template that describes a topology of network service 26. Further, network service descriptor 25 may include one or more Virtual Link Descriptors (VLD) 32, each of which is a deployment template that describes the resource requirements that are needed for a link between VNFs 23, PNFs if any, and endpoints of network service 26. Further, network service descriptor 25 may include one or more Physical Network Function Descriptor (PNFD) 33, each of which (if present) describes the connectivity, interface and key performance indicators (KPIs) requirements of virtual links to an attached PNF. Such information may be needed if a physical device is incorporated in network service 26 to facilitate subsequent network evolution.

Controller 24 orchestrates network service 26 by, in part, placing, for execution, VNFs for network service 26 to network function virtualization infrastructure. More specifically in some cases, based at least on network service descriptor 25 and the respective device profile 28 and VNF descriptor 27, controller 24 may orchestrate the VNFs for each network service 26 in part by identifying available NFVI and instantiating VNFs 23 of the network service 26 to the NFVI.

Controller 24 may orchestrate VNFs 23A1, 23A2, and 23X1 to provision and configure servers 12A, 12X with the VNFs. Controller 24 may also provision the data center 10 network and servers 12 with network forwarding information to implement the network function forwarding graph for network service 26.

In a typical data center 10, various types of VNFs 23 are chained together to form a service chain that implements a network service. To implement the network service, controller 24 instantiates and manages the lifecycle of each of the various types of VNFs 23 across different NFVI platforms that may be located in one or more data centers, such as data center 10. Implementing and deploying VNFs 23 may require controller 24 to perform different or similar operations across different platforms and different deployment environments. To orchestrate thousands of VNFs over multiple different types of NFVI may require many thousands of different VNF configurations.

In accordance with techniques of the disclosure, controller 24 may efficiently configure and instantiate VNFs 23 to different types of NFVI including at least servers 12 by leveraging device profiles 28A-28K (collectively, "device profiles 28") that each includes configuration data and/or defines one or more workflows for obtaining configuration data for configuring VNFs 23. Instantiating and deploying VNFs 23 to form network service chain 26 implementing an NFV may require controller 24 to perform different or similar operations across different platforms and different deployment environments. Accordingly, device profiles 28 encapsulate and organize the various types of implementation differences that may be applied to different types of VNF 23.

Further, each network service descriptor 25 as described herein further includes a VNF descriptor 27, which provides information sufficient for controller 24 to instantiate a specific instance of a VNF package specified in the VNF descriptor 27. In some examples, VNF descriptor 27 further includes a device family 51 for the VNF package. Device family 51 identifies a type of the VNF referenced by the VNF descriptor 27, where the type of VNF refers to a collection of VNFs having a similar architecture and thus configurable using values for identical parameters. A VNF package is an executable package for a VNF in that the VNF package includes an executable software image for the VNF. The VNF package may also include non-executable data, such as a manifest file.

The VNF package may be stored to a VNF catalog (not shown) that represents a repository of on-boarded VNF packages, which may each include a software image and manifest file. A VNF catalog may store multiple different versions of a single VNF package that correspond to different implementations of the same network function, different versions to run in different execution environments, or different release versions of the same software.

To instantiate a particular instance of VNF 23, such as VNF 23A1, within a particular operating environment and tie the new VNF 23A1 to a service chain 26, controller 24 obtains configuration data using one of device profiles 28 indicated by VNF descriptor 27 and more particularly in this example by device family 51. Controller 24 may use configuration data statically defined by the device profile as well as execute one or more workflows defined in the device profile to invoke APIs on other components and/or microservices to resolve resources required to instantiate VNF 23A1 in the operating environment and tie VNF 23A1 to the service chain.

In this way, the described techniques may allow controller 24 to dynamically and flexibly adapt and instantiate instances of VNFs 23, regardless of the underlying implementation requirements for differing types of VNFs 23. Such a system may further allow controller 24 to deploy VNFs 23 across various NFVI architectures without requiring customization for each instance of VNFs 23 that is specific to the NFVI architectures.

Figure 2:
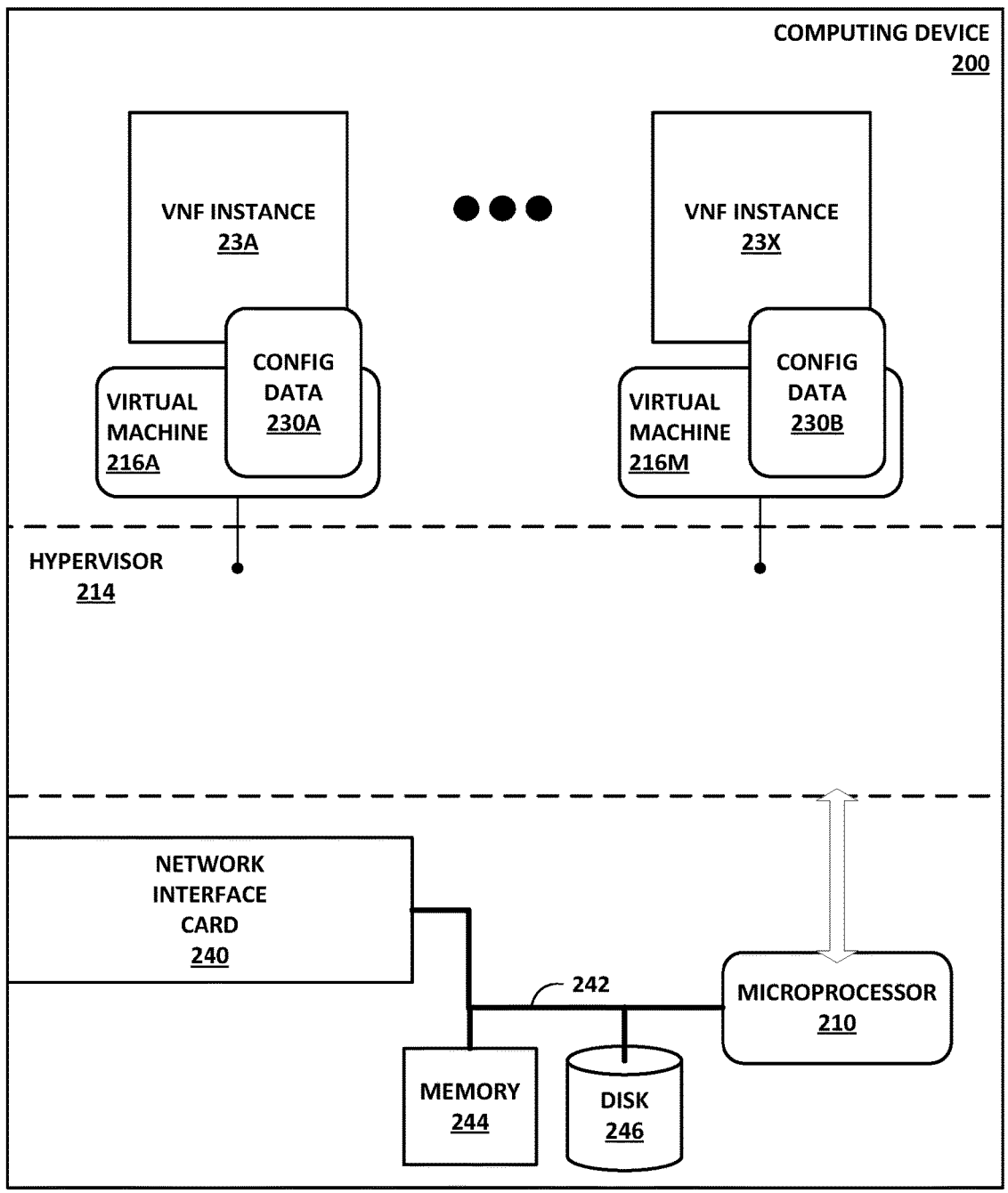
FIG. 2 is an example computing device that implements one or more virtualized network functions, assigned by a controller or other orchestrator.

FIG. 2 is an example computing device that implements one or more virtualized network functions, assigned by a controller or other orchestrator. Computing device 200 may represent a real or virtual server and may represent an example instance of any of servers 12 of FIG. 1. Computing device 200 includes in this example, a system bus 242 coupling hardware components of a computing device 200 hardware environment. System bus 242 couples memory 244, network interface card (NIC) 240, storage disk 246, and microprocessor 210. Network interface card 240 includes one or more interfaces configured to exchange packets using links of an underlying physical network. Microprocessor 210 may include one or more processors each including an independent execution unit to perform instructions that conform to an instruction set architecture. Execution units may be implemented as separate integrated circuits (ICs) or may be combined within one or more multi-core processors (or "many-core" processors) that are each implemented using a single IC (i.e., a chip multiprocessor).

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 210.

Main memory 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 144 provides a physical address space composed of addressable memory locations.

Memory 244, NIC 240, storage disk 246, and microprocessor 210 provide an operating environment for a software stack that executes a hypervisor 214 and one or more virtual machines 216A-216M (collectively, "virtual machines 216"). While illustrated and described with respect to virtual machines, VNF instances 23A-23X may be executed by other operating environments, such as containers (e.g., a DOCKER container). An operating system kernel (not shown in FIG. 2) may execute in kernel space and may include, for example, a Linux, Berkeley Software Distribution (BSD), another Unix-variant kernel, or a Windows server operating system kernel, available from Microsoft Corp.

Computing device 200 executes a hypervisor 214 to manage virtual machines 216. Example hypervisors include Kernel-based Virtual Machine (KVM) for the Linux kernel, Xen, ESXi available from VMware, Windows Hyper-V available from Microsoft, and other open-source and proprietary hypervisors. Hypervisor 214 may represent a virtual machine manager (VMM).

Virtual machines 216 host corresponding VNF instances 23A-23X (collectively, "VNF instances 23"). In some examples, a virtual machine 216 may host one or more VNF instances 23. Each of VNF instances 23 is configured to apply a network function to packets. VNF instances 23 may represent example instances of VNFs 23 of FIG. 1.

In some cases, each of virtual machines 216 includes a virtual driver presented directly into the virtual machine guest operating system, effectively bypassing hypervisor 214 to offer direct communication between NIC 240 and the virtual machine. This may reduce hypervisor 214 overhead involved with software-based, vSwitch implementations.

Computing device 200 may be one of a plurality of computing devices within data center 10. Further, each computing device 200 may have a unique operating environment or platform. For example, each computing device 200 may implement different hardware, such as various combinations of microprocessor 210, disk 236, memory 244, and network interface card 240. Further, each computing device 200 may implement different software platforms. For example, a computing device 200 may implement OpenContrail, Amazon Web Services (AWS), or KVM operating on a bare-metal platform. Furthermore, each computing device 200 may have different implementation and deployment policies that depend on the service provider network 7 or data center 10 within which the computing device is located. For example, a computing device 200 may be configured to use one of DHCP or static IP addressing, implement specific configuration for traffic steering into and out of VNF instances 23, and implement policies as to whether each VLAN ID is configured within VNF instances 23 or externally. As described above, it may be impractical to program all the implementation differences in the code of controller 24 for configuring computing device 200 with the implementation differences.

To instantiate a particular instance of VNF 23, such as VNF 23A, within a particular operating environment and tie the new VNF 23A to a service chain 26, controller 24 identifies a device profile indicated at least in part by VNF descriptor 27 and more particularly by device family 51. Using the device profile, controller 24 obtains configuration information 230A required to instantiate VNF 23A in the operating environment and tie VNF 23A to the service chain. Configuration data 230A may be usable for configuring the VNF package instantiated as VNF instance 23A and/or for configuring virtual machine 216A for implementing a forwarding graph, e.g., by configuring traffic steering by the virtual machine 216A.

In some examples, the device profile 28 for VNF instance 23A contains bootstrap configuration information sufficient for controller 24 to compute a bootstrap configuration having configuration data 230A for VNF instance 23A within the specific environment of computing device 200. Such bootstrap configuration information includes an initial configuration for VNF instance 23A that allows external controller 24 to communicate with VNF instance 23A. For example, the bootstrap configuration information may configure VNF instance 23A to accept network connections and communicate according to a particular networking protocol (e.g., SSH, HTTP, or HTTPS) with external controller 24 for further run-time configurations. Further, the bootstrap configuration information may include an assignment of interfaces, VLANs, and MAC addresses for VNF instance 23A.

In some examples, the device profile 28 provides information sufficient for controller 24 to compute a traffic steering configuration having configuration data 230A for VNF instance 23 within the specific environment of computing device 200. For example, the device profile 28 may specify interfaces, such as the attachment of an interface of VNF instance 23A to a physical port of NIC 240, a management interface for VNF instance 23A, or a VLAN interface for VNF instance 23A.

Accordingly, the techniques described herein allow for dynamic and flexible instantiation of VNFs regardless of the underlying implementation requirements of differing types of VNFs or operating environments. Such a system may allow for instantiation of VNFs across multiple types of computing devices 200 across multiple NFVI architectures without requiring specific customization for each NFVI architecture or without regard to the specific operating environment provided by each NFVI architecture.

Figure 3:
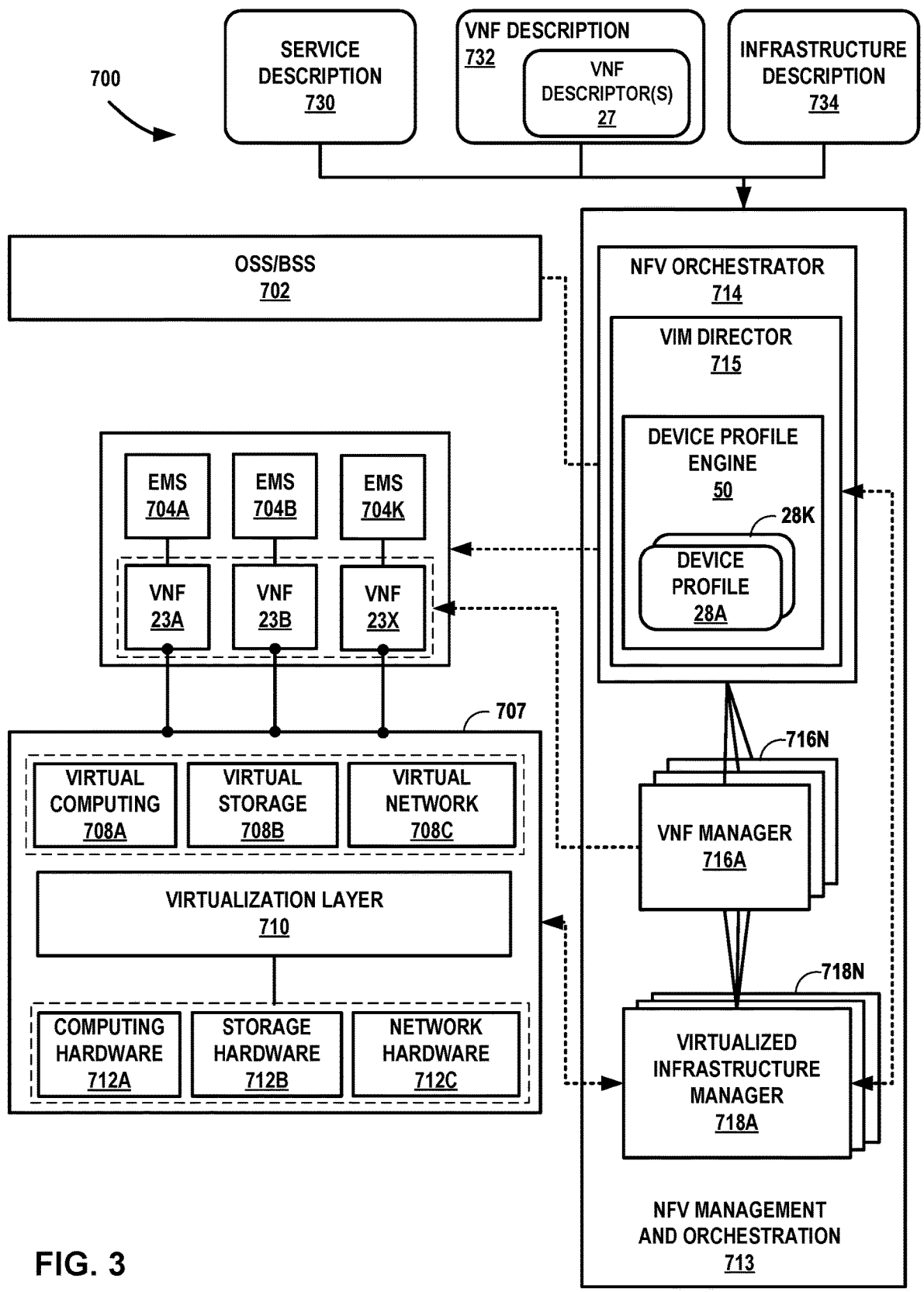
FIG. 3 is a block diagram illustrating an example NFV architectural framework, according to techniques described in this disclosure.

FIG. 3 is a block diagram illustrating an NFV architectural framework, according to techniques described in this disclosure. Framework 700 may be implemented using one or more distributed computing devices. Framework 700 includes NFV Management Orchestration 713 having an NFV orchestrator 714, one or more VNF managers 716A-716N, and virtualized infrastructure manager (VIM) 718. NFV Management and Orchestration 713 may be implemented by any of controllers 24 described herein. Each of VIMs 718 may be deployed and operated by a NFVI provider for a data center 10, such as an Infrastructure-aaS, Platform-aaS, or other cloud service provider.

Framework 700 also includes Operations and Business Support Systems (OSS/BSS) 702, multiple VNF instances 23A-23X and corresponding Element Management Systems (EMSs) 704A-704K, and NFVI 707. NFVI 707 includes computing hardware 712A, storage hardware 712B, and network hardware 712C for executing VNFs 23. NFVI 707 further includes a virtualization layer 710 over the hardware to offer virtual computing 708A, virtual storage 708B, and virtual network 708C for executing VNFs 23 using virtual environments.

Service description 730, VNF description 732, and infrastructure description 734 provide information regarding the VNF deployment templates, VNF forwarding graphs, service-related information, and NFVI information models. Infrastructure description 734 may describe the multi-layer switch hierarchy for a data center that includes the NFVI network infrastructure. Infrastructure description 734 may include, for example, Lists A-D. Service description 730 may include network service descriptors in some cases extended to include intra-network service and inter-network service weights.

NFV Orchestrator 714 may be executed by one or more computing devices in a centralized or distributed manner. In accordance with techniques described herein, NFV orchestrator 714 includes a VIM director 715 to manage each of VIMs 718A-718N that each have a different VIM-type and corresponding NFVI architecture. VIM director 715 uses device profiles 28 to dynamically resolve configuration data for VNFs 23 to be instantiated to NFVI 707 for various VIMs 718.

In a typical NFV service chain, various types of VNFs 23 are chained together to form a service chain that implements each NFV. To implement the service chain, NFV Orchestrator 714 and VNF Manager 716 instantiate and manage the lifecycle of each of the various types of VNFs 23 across different cloud platforms. For a given service chain described by a given Network Service Descriptor (NSD) of service description 730, NFV Orchestrator 714 and VNF Manager 716 each perform a discrete series of tasks to instantiate and manage a VNF 23 within the service chain.

These series of tasks that NFV Orchestrator 714 and VNF Manager 716 each perform to instantiate and deploy a VNF 23 may be the same or differ across different platforms in different deployment environments. For example, these differences may arise from differences in the underlying one of VIMs 718 being used by NFV Orchestrator 714 to manage the NFVI 707 to which the VNF is to be deployed. For example, VIM 718A may implement OpenContrail and require different processes to instantiate a VNF 23 and tie the VNF 23 to a service chain versus a VIM 718B that implements Amazon Web Services (AWS) or a VIM 718N that implements Kernel-based Virtual Machine (KVM) for Linux that is operating on a bare-metal platform. Other differences may result from differences in implementation and deployment policies of different service provider networks 7 and/or data centers 10. For example, network administrators of data center 10 may elect to use one of DHCP or static IP addressing, implement specific configuration for traffic steering into and out of VNFs 23, and implement policies as to whether each VLAN ID is configured within VNFs 23 or externally. These differences cannot be statically captured inside an NSD 25 and a VNFD 27 because the NSD 25 and VNFD 27 are typically created statically prior to instantiation and deployment of each VNF instance 23. Therefore, the NSD 25 and VNFD 27 should be agnostic to the above implementation differences in instantiation of VNFs 23. Further, it is not practical to program all the implementation differences in the code of NFV Orchestrator 714 and VNF Manager 716.

A typical VNFD 27 contains information sufficient to describe a specific network function for instantiation. As described herein, each VNFD 27 additionally includes a device family 51 specifying a type of the network function. A given VNFD 27 may specify only a single device family 51. However, multiple different VNFDs may specify the same device family 51. To create a VNF instance 23A of a VNF package and tie VNF instance 23A to a service chain, NFV Orchestrator 714 and/or VNF Managers 716 use information specified by a VNFD 27 and, more particularly, device family 51 to query device profile engine 50 of VIM director 715 to obtain configuration data for the corresponding VNF to be instantiated.

As described herein, VIM director 715 includes a device profile engine 50. Device profile engine 50 compiles accesses device profiles 28 to resolve configuration parameters for VNFs to be instantiated as VNFs 23. Device profile engine 50 may provide Application Programming Interfaces (APIs) with which orchestrator 714 and/or VNF Managers 714 may use to access device profiles 28 to resolve instantiation workflows for VNF packages. For example, device profile engine 50 assists NFV Orchestrator 714 and VNF Manager 716 in defining a workflow for instantiating a VNF instance 23 of a VNF package and tying the VNF instance 23 to an appropriate service chain via a corresponding device profile 28 for the instantiated VNF 23. The device profile 28 identified for a VNF based on the device family specified in the VNF descriptor 27 for the VNF includes information sufficient for NFV Orchestrator 714 and VNF Manager 716 to, e.g., compute a bootstrap configuration for the instantiated VNF 23 and compute a traffic steering configuration for the instantiated VNF 23.

In some examples, an identified device profile 28 for instantiating a VNF instance 23A defines one or more input configuration parameters for which Network Function Virtualization Orchestrator (NFVO) 714 or one of Virtualized network function Manager (VNFM) 716 may input values when such values are available to the NFVO 714 or VNFM 716. The identified device profile 28 may also or alternatively statically define values for one or more configuration parameters. The identified device profile 28 may also or alternatively specify one or more workflows that, when executed by controller 24, dynamically resolve, by invoking other components/micro-services, one or more configuration parameters to obtain values for the parameters.

The identified device profile 28 may further define one or more configuration templates for configuring a VNF instance 23A and/or a virtual machine, container, or other NFVI for the VNF instance. The configuration template may be completed using configuration parameters resolved by device profile engine 50 using the input configuration parameters, statically-defined configuration parameters, or dynamically resolved configuration parameters described above. NFVO 714 or VNFM 716 may apply the completed configuration template to a VNF package for the VNF instance 23A as part of instantiating VNF 23A in the operating environment and tying VNF 23A to the service chain.

In some examples, NFV management and orchestration includes a plurality of VIMs 718A-718N (collectively, "VIMs 718"). In such an architecture, each VIM 718 is associated with a VIM-type that describes a southbound interface for the particular VIM 718. In some examples, NFV Orchestrator 714 and VNF Manager 716 use the VIM-type that identifies a type of the VIM 718 (as determined by NFV Orchestrator 714), to be used as the NFVI to host a VNF instance 23 described by a VNFD 27, as a secondary key to identify a device profile 28 for particular VNF package suitable for the architecture of a specific VIM 718. That is, in such examples, a combination of device family and VIM-type uniquely identify a device profile from device profiles 28. In this way, the techniques may enable adapting a common/generic VNF instance to multiple different operating environments corresponding to respective VIM-types.

Figure 4:
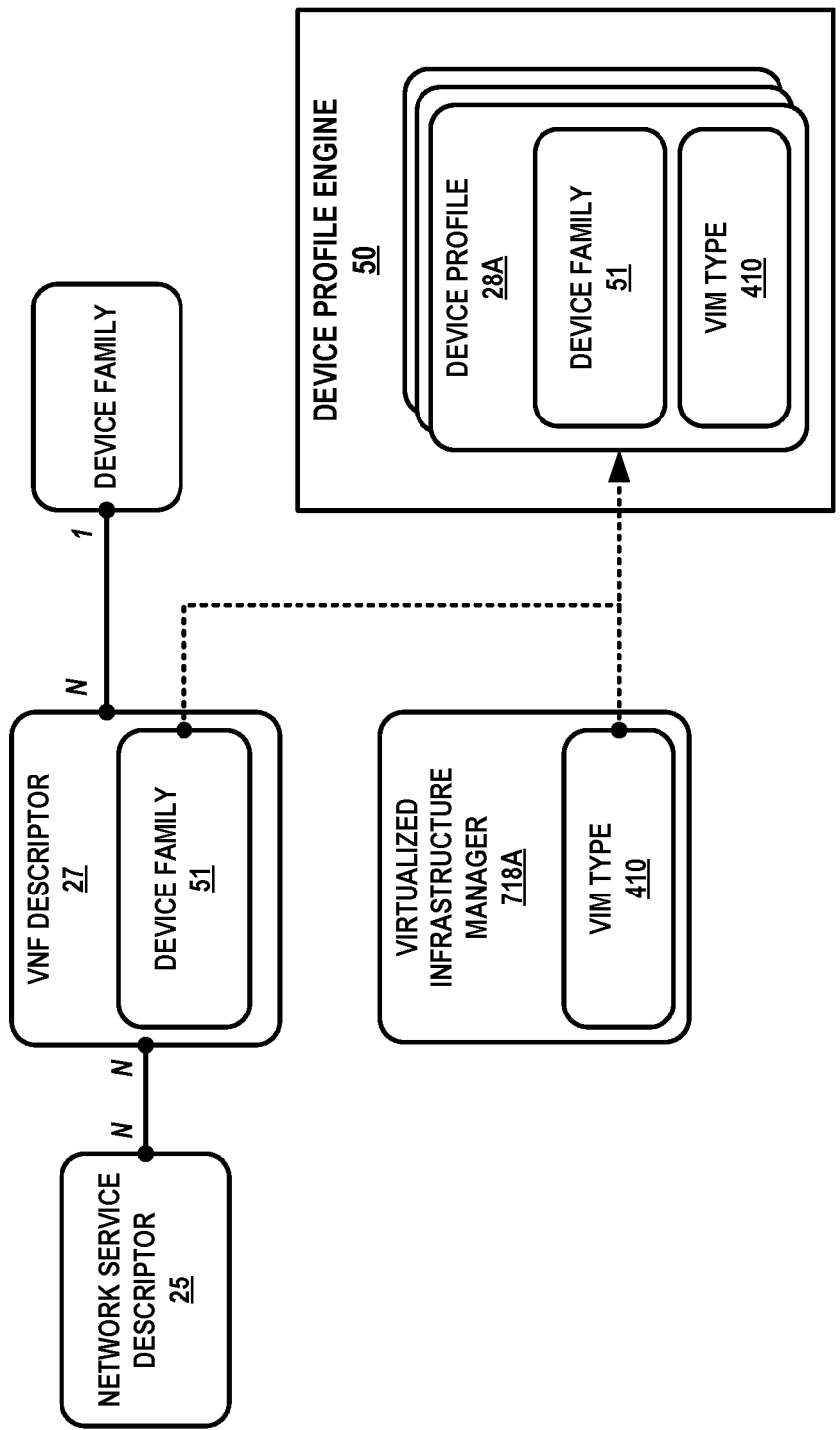
FIG. 4 is a block diagram illustrating relationships among components for implementing techniques according to this disclosure.

FIG. 4 is a block diagram illustrating relationships among components for implementing techniques according to this disclosure. For convenience, FIG. 4 is described with respect to FIG. 3.

As described above, NFV Management and Orchestration 713 use information provided by VNFDs 27 to create and manage VNF instances 23. Each VNFD 27 is extended as described herein to additionally include a key defining a device family 51 to which a VNF belongs. VNFD 27 including a device family 51 describes the attributes and requirements necessary for NFV Management and Orchestration 713 to instantiate an instance of a VNF to a particular NFVI architecture. The use of such VNFDs 27 allows for flexible deployment and portability of instances of VNFs.

NFV Management and Orchestration 713 may instantiate multiple (N) network service chains each described by a different network service descriptor 25. Each network service descriptor may include one or more (N) VNF descriptors 27, where each VFN descriptor 27 specifies one (1) device family.

An example network service descriptor 25 that having two VNF descriptors 27 each specifying a different device family, in accordance with the techniques of the disclosure is provided below:

```
{
  "uuid": "41f15681-546a-4f42-afc8-ea0bd85bdf2d",
  "name": "Easy-VPN-Service-Site-package",
  "nsd": {
    "name": "Easy-VPN-Service-Site",
    "provider": "Orange",
    "description": "Easy VPN services per customer site",
    "vld": [
      {
        "id": "wanopt-left",
        "vld-ref" : "096f97c4-f209-4446-8293-4f9d90d81d26"
      },
      {
        "id": "wanopt-right",
        "vld-ref": "4b36dc60-653d-4a8a-b733-ce9b4beaa937"
      },
      [...]
    ],
    "vnfd": [
      {
        "id": "wanopt",
        "vnfd-ref": "1b606547-2615-11e5-9b3f-406c8f440685"
        "device-family": "c210"
      },
      {
        "id": "fw",
        "vnfd-ref": "1b606547-2615-11e5-9b3f-406c8f440686"
        "device-family": "ae61"
      }
    ],
    "monitoring-parameter": [
      {
        "param-id": "num-sessions",
        "description": "Total sessions for the Network Service"
      }
    ],
    "connection-point": [
      {
        "id":"ns-mgmt"
      },
      [...]
    ],
    "forwarding-graph": [
      {
        "id": "site-access",
        "number-of-end-points":4,
        "number-of-virtual-links":2,
        "dependent-virtual-link": [
          { "id":"wanopt-left" }, { "id":"wanopt-right" }
        ]
      }
    ],
    "network-forwarding-path": [
      {
        "id":"1",
        "connection":[ "0","1","2","3"]
      }
    ],
```

-continued

```
"connection-point":[
   {
      "constituent-vnfs":["wanopt", "fw"]
   },
   [...]
],
"service-deployment-flavour": [
   {
      "id": "Gold",
      "description": "Gold Service",
      "constituent-vnf": [
         {
            "vnf-reference": "wanopt",
            "vnf-flavour-id-reference": "Gold",
            "number-of-instances": 1
         },
         {
            "vnf-reference": "fw",
            "vnf-flavour-id-reference": "Gold",
            "number-of-instances": 1
         },
      ],
"vnf-config": [
   {
      "vnfd-id": "wanopt",
      "vnfd-uuid": "1b606547-2615-11e5-9b3f-406c8f440685",
      "selected-function-chain": {"function-chain-name": "WANOPT"}
   },
   {
      "vnfd-id": "fw",
      "vnfd-uuid": "1b606547-2615-11e5-9b3f-406c8f440686",
      "selected-function-chain": {"function-chain-name": "FW"}
   },
   ],
}
```

In the above example, a VNF descriptor for "wanopt" includes a device-family parameter having value "c210" while a VNF descriptor for "fw" includes a device-family parameter having value "ae61", where the device-family parameters each specify the device family.

To create a VNF instance 23A of a VNF package and tie the VNF instance 23A to a service chain, NFV Orchestrator 714 and VNF Manager 716 determine the device family 51 from a VNFD 27 of NSD 25. NFV Orchestrator 714 and VNF Manager 716 formulate a request that includes the device family identifier 51 and issue the request to device profile engine 50, which provides configuration data for the VNF instance 23A. The request may further include a secondary key that specifies a VIM-type 410 of VIM 718A corresponding to the type of NFVI to host the VNF instance 23A. Using the device family 51 and the VIM-type 410, device profile engine 50 identifies a device profile 28A, e.g., uniquely associated with the device family 51 value and the VIM-type 410 value.

Device profile engine 50 resolves the configuration parameters as described above and provides configuration data, e.g., in the form of a completed configuration template, to NFV Orchestrator 714 and/or VNF Manager 716. NFV Orchestrator 714 and/or VNF Manager 716 apply the configuration data to create the VNF instance 23A and tie the VNF instance 23A to the service chain.

Figure 5:
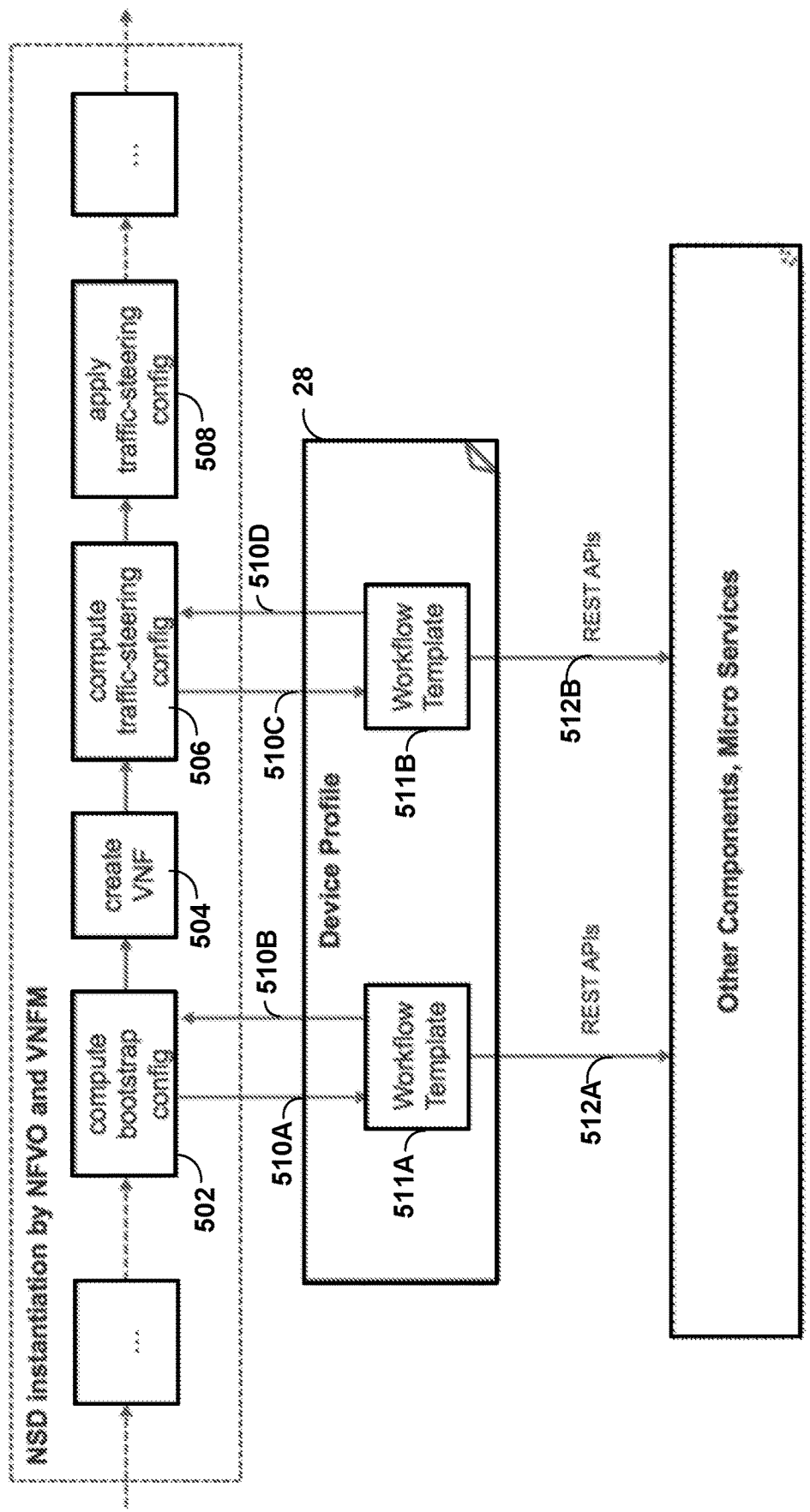
FIG. 5 is a conceptual diagram illustrating an example workflow for instantiating a VNF using a device profile, in accordance with the techniques of the disclosure.

FIG. 5 is a conceptual diagram illustrating an example workflow for instantiating a VNF using a device profile, in accordance with the techniques of the disclosure. For convenience, FIG. 5 is described with respect to FIG. 3.

As described above, NFV Management and Orchestration 713 use information provided by VNFDs 27 to create and manage VNF instances 23. NFV Management and Orchestration 713 instantiates a network service chain described by a network service descriptor 25. Device profile engine 50 compiles accesses device profiles 28 to resolve configuration parameters for VNFs to be instantiated as VNFs 23. Device profile engine 50 may provide Application Programming Interfaces (APIs) with which orchestrator 714 and/or VNF Managers 714 may use to access device profiles 28 to obtain configuration data for VNF packages.

In the example of FIG. 5, NFV Management and Orchestration 713 receive an NSD 25 defining instantiation of one or more VNF instances, the one or more VNF instances including VNF 23A. To instantiate VNF 23A, NFV Orchestrator 714 and VNF Manager 716 compute a bootstrap configuration for VNF 23A (502). To resolve the bootstrap configuration for VNF 23A, NFV Orchestrator 714 and VNF Manager 716 determine the device family 51 from a VNFD 27 of NSD 25. NFV Orchestrator 714 and VNF Manager 716 formulate a request that includes the device family identifier 51 and issue the request to device profile engine 50. The request may further include a secondary key that specifies a VIM-type 410 of VIM 718A corresponding to the type of NFVI to host the VNF instance 23A.

Device profile engine 50 receives the request from NFV Orchestrator 714 and VNF Manager 716 (510A). Based on the device family identifier 51 and the secondary key that specifies the VIM-type 410, device profile engine 50 identifies a corresponding device profile 28 for VNF 23A. The device profile provides configuration parameters to resolve instantiation and bootstrap configuration of VNF 23A. Further, the device profile may include a workflow template 511A for obtaining configuration data from one or microservices or other components for the bootstrap configuration for VNF 23A (512A). Device profile engine 50 uses the device profile to resolve the bootstrap configuration parameters for VNF 23A. Device profile engine 50 may provide configuration data, e.g., in the form of a completed bootstrap configuration template, to NFV Orchestrator 714 and/or VNF Manager 716 (510B). NFV Orchestrator 714 and/or VNF Manager 716 apply the bootstrap configuration template to resolve the bootstrap configuration for VNF 23A to create VNF 23A (504).

To tie VNF 23A to the service chain, NFV Orchestrator 714 and VNF Manager 716 compute a traffic steering configuration for VNF 23A (506). To resolve the traffic steering configuration for VNF 23A, NFV Orchestrator 714 and VNF Manager 716 determine the device family 51 from VNFD 27 of NSD 25. NFV Orchestrator 714 and VNF Manager 716 formulate a request that includes the device family identifier 51 and issue the request to device profile engine 50 (510C). The request may further include a secondary key that specifies a VIM-type 410 of VIM 718A corresponding to the type of NFVI to host the VNF instance 23A.

Device profile engine 50 receives the request from NFV Orchestrator 714 and VNF Manager 716 (510C). Based on the device family identifier 51 and the secondary key that specifies the VIM-type 410, device profile engine 50 identifies a corresponding device profile 28 for VNF 23A. The device profile provides configuration parameters to resolve a traffic steering configuration of VNF 23A. Further, the device profile may include a workflow template 511B for obtaining configuration data from one or more microservices or other components for the traffic steering configuration for VNF 23A (512B). Device profile engine 50 uses the device profile to resolve the traffic steering configuration parameters for VNF 23A. Device profile engine 50 may provide configuration data, e.g., in the form of a completed traffic steering configuration template, to NFV Orchestrator 714 and/or VNF Manager 716 (510D). NFV Orchestrator 714 and/or VNF Manager 716 apply the traffic steering configuration template to apply the traffic steering configuration for VNF 23A and tie VNF 23A to the service chain (508).

Figure 6:
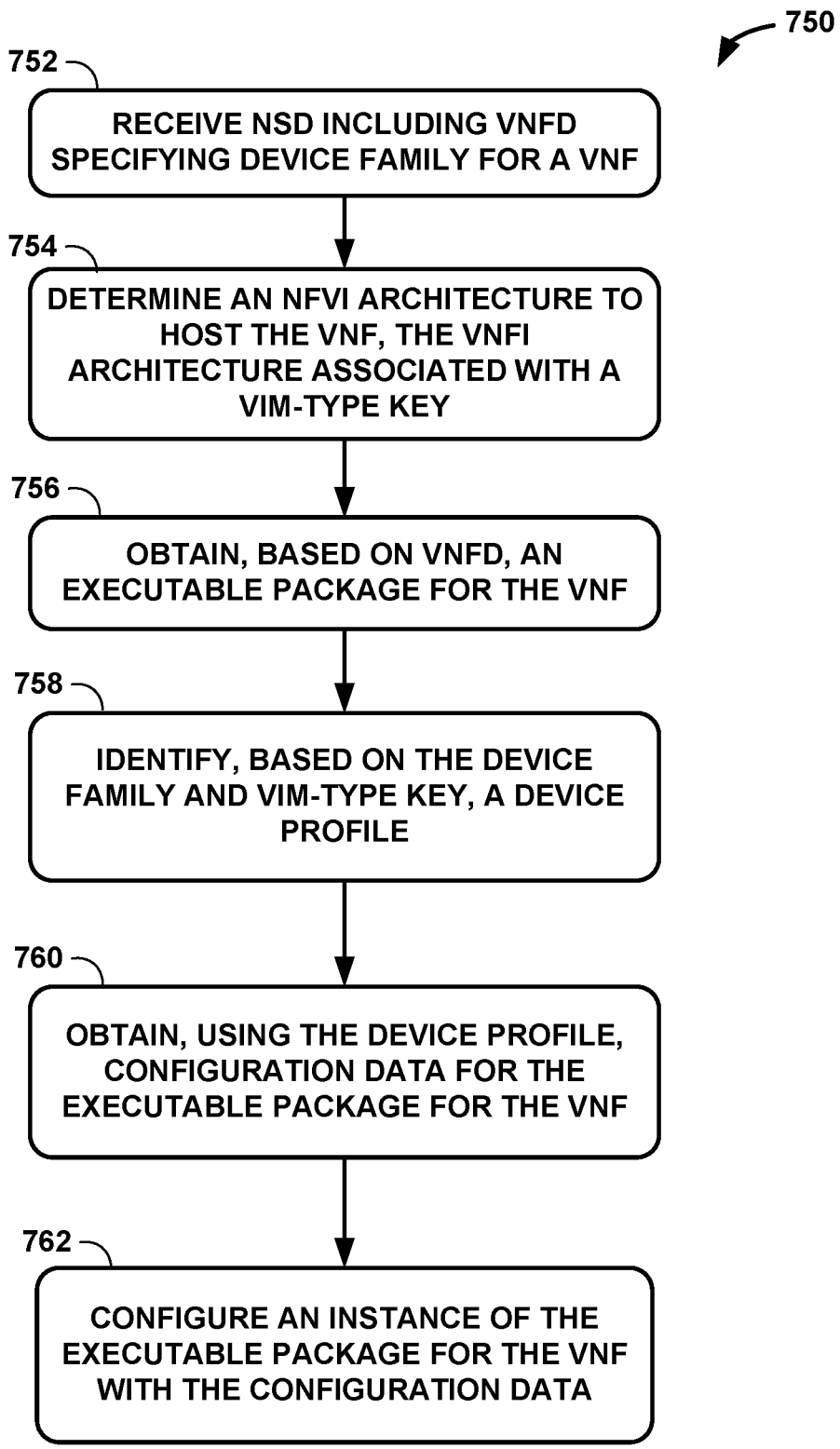
FIG. 6 is a flowchart illustrating an example operation instantiating a virtualized network function, in accordance with the techniques of the disclosure.

FIG. 6 is a flowchart illustrating an example operation instantiating a virtualized network function, in accordance with the techniques of the disclosure. For convenience, example mode of operation 750 is described with respect to controller 24 of FIG. 1. In the example of FIG. 6, controller 24 implements NFV Orchestrator 714 and VNF Manager 716 to create an instance of VNF 23A and configure traffic steering for VNF instance 23A to operate within service chain 26.

Controller 24 receives an NSD 25 that includes a VNFD 27 for VNF 23A (752). The VNFD 27 includes a device family 51. Controller 24 determines an NFVI architecture (e.g., Contrail, AWS, Microsoft Azure) to host the VNF 23A, where the NFVI architecture is associated with a VIM-type 410 (754). That is, the VIM-type 410 corresponds to a type of NFVI for hosting the VNF instance 23A specified by NSD 25. Controller 24 obtains an executable package for VNF 23A identified by the VNFD 27 (756).

Controller 24, based on the device family 51 of VNFD 27 for VNF 23A and the VIM-type 410, identifies a device profile 28 for the executable package for VNF 23A (758). The identified device profile is usable for obtaining configuration data for VNF 23A. For example, the device profile may include one or more workflows for invoking APIs of microservices that return configuration data for the configuration for VNF 23A. Controller 24 obtains, based on the device profile, configuration data for the executable package for VNF 23A (760). For example, controller 24 may obtain statically-defined configuration values included in the device profile. In further examples, controller 24 may execute one or more APIs and microservices included the workflows. Controller 24 configures the instance of VNF 23A based on the configuration data obtained using the device profile (762). For example, based on the configuration data, controller 24 instantiates an instance of VNF 23A, applies a bootstrap configuration to VNF 23A, applies a traffic steering configuration to VNF 23A, and ties VNF 23A to a service chain to implement a network service.

Figure 7:
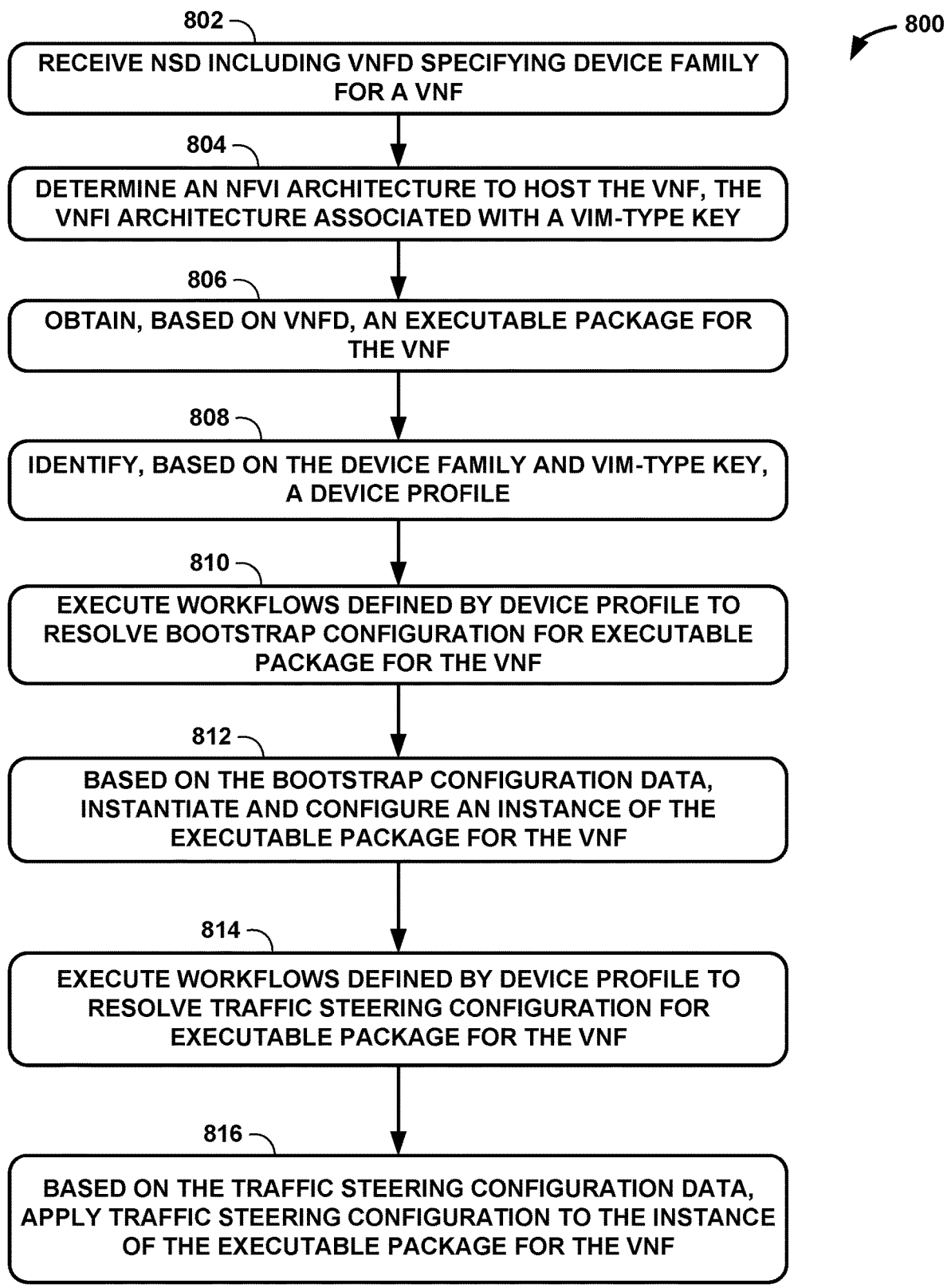
FIG. 7 is a flowchart illustrating an example operation for instantiating a virtualized network function, in accordance with the techniques of the disclosure.

FIG. 7 is a flowchart illustrating an example operation for instantiating a virtualized network function, in accordance with the techniques of the disclosure. For convenience, example mode of operation 800 is described with respect to controller 24 of FIG. 1. In the example of FIG. 6, controller 24 implements NFV Orchestrator 714 and VNF Manager 716 to create an instance of VNF 23A and configure traffic steering for VNF instance 23A to operate within service chain 26.

Controller 24 receives an NSD 25 that includes a VNFD 27 for VNF 23A (802). The VNFD 27 includes a device family 51. Controller 24 determines an NFVI architecture (e.g., Contrail, AWS, Microsoft Azure) to host the VNF 23A, where the NFVI architecture is associated with a VIM-type 410 (804). That is, the VIM-type 410 corresponds to a type of NFVI for hosting the VNF instance 23A specified by NSD 25. Controller 24 obtains an executable package for VNF 23A identified by the VNFD 27 (806).

Controller 24, based on the device family 51 of VNFD 27 for VNF 23A and the VIM-type 410, identifies a device profile 28 for the executable package for VNF 23A (808). The identified device profile is usable for obtaining configuration data for VNF 23A. For example, the device profile may include one or more workflows for invoking APIs of microservices that return configuration data for the configuration for VNF 23A. Controller 24 executes the one or more workflows to resolve bootstrap configuration data for the executable package for VNF 23A (810). For example, controller 24 may obtain statically-defined configuration values included in the device profile. In further examples, controller 24 may execute one or more execute one or more APIs and microservices included the workflows to generate the bootstrap configuration data for the executable package for VNF 23A. Based on the bootstrap configuration data, controller 24 instantiates an instance of VNF 23A and applies a bootstrap configuration to VNF 23A (812). Controller 24 further executes the one or more workflows to resolve traffic steering configuration data for the executable package for VNF 23A (814). Based on the bootstrap configuration data, controller 24 applies a traffic steering configuration to VNF 23A, and ties VNF 23A to a service chain to implement a network service (816).

Figure 8:
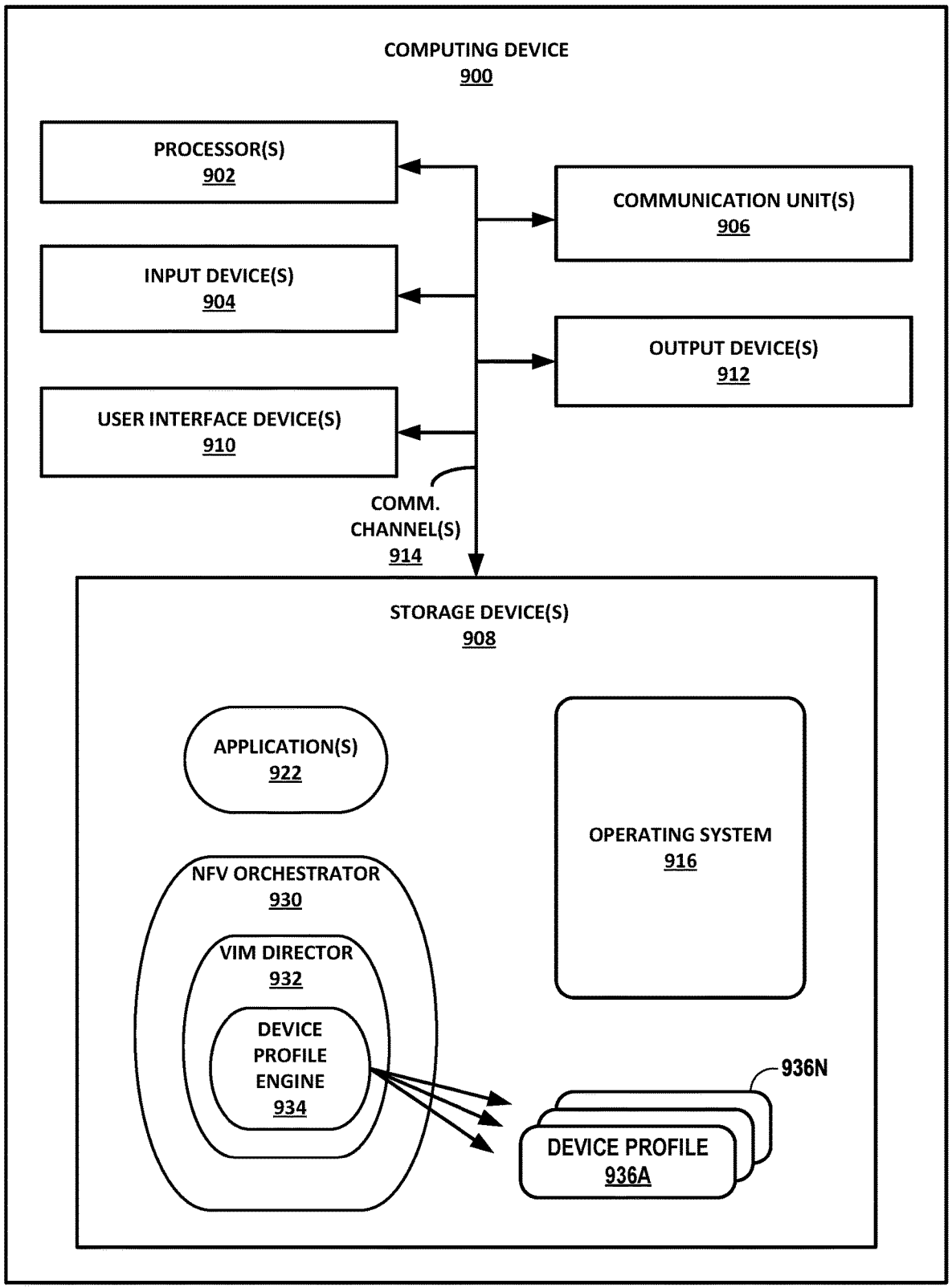
FIG. 8 is a block diagram illustrating further details of one example of a computing device that operates in accordance with one or more techniques of the present disclosure.

FIG. 8 is a block diagram illustrating further details of one example of a computing device that operates in accordance with one or more techniques of the present disclosure. FIG. 8 may illustrate a particular example of a server or other computing device 900 that includes one or more processor(s) 902 for executing any one or more of controller 24, a computing device that implements one or more aspects of NFV management and orchestration 713, or another computing device described herein. Other examples of computing device 900 may be used in other instances. Although shown in FIG. 8 as a stand-alone computing device 900 for purposes of example, a computing device may be any component or system that includes one or more processors or other suitable computing environment for executing software instructions and, for example, need not necessarily include one or more elements shown in FIG. 8 (e.g., communication units 906; and in some examples components such as storage device(s) 908 may not be co-located or in the same chassis as other components).

As shown in the specific example of FIG. 8 computing device 900 includes one or more processors 902, one or more input devices 904, one or more communication units 906, one or more output devices 912, one or more storage devices 908, and user interface (UI) device 910, and communication unit 906. Computing device 900, in one example, further includes one or more applications 922 and one or more of NFV orchestrator 930, VIM director 932, device profile engine 934, one or more device profiles 936A-936N (collectively, "device profiles 936"), and operating system 916 that are executable by computing device 900. Each of components 902, 904, 906, 908, 910, and 912 are coupled (physically, communicatively, and/or operatively) for inter-component communications. In some examples, communication channels 914 may include a system bus, a network connection, an inter-process communication data structure, or any other method for communicating data. As one example, components 902, 904, 906, 908, 910, and 912 may be coupled by one or more communication channels 914.

Processors 902, in one example, are configured to implement functionality and/or process instructions for execution within computing device 900. For example, processors 902 may be capable of processing instructions stored in storage device 908. Examples of processors 902 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 908 may be configured to store information within computing device 900 during operation. Storage device 908, in some examples, is described as a computer-readable storage medium. In some examples, storage device 908 is a temporary memory, meaning that a primary purpose of storage device 908 is not long-term storage. Storage device 908, in some examples, is described as a volatile memory, meaning that storage device 908 does not maintain stored contents when the computer is turned off. Examples of volatile memories include random access memories (RAM), dynamic random access memories (DRAM), static random access memories (SRAM), and other forms of volatile memories known in the art. In some examples, storage device 908 is used to store program instructions for execution by processors 902. Storage device 908, in one example, is used by software or applications running on computing device 900 to temporarily store information during program execution.

Storage devices 908, in some examples, also include one or more computer-readable storage media. Storage devices 908 may be configured to store larger amounts of information than volatile memory. Storage devices 908 may further be configured for long-term storage of information. In some examples, storage devices 908 include non-volatile storage elements. Examples of such non-volatile storage elements include magnetic hard disks, optical discs, floppy disks, Flash memories, or forms of electrically programmable memories (EPROM) or electrically erasable and programmable (EEPROM) memories.

Computing device 900, in some examples, also includes one or more communication units 906. Computing device 900, in one example, utilizes communication units 906 to communicate with external devices via one or more networks, such as one or more wired/wireless/mobile networks. Communication units 906 may include a network interface card, such as an Ethernet card, an optical transceiver, a radio frequency transceiver, or any other type of device that can send and receive information. Other examples of such network interfaces may include 3G and WiFi radios. In some examples, computing device 900 uses communication unit 906 to communicate with an external device.

Communication units 906 may receive network descriptor 25, VNF descriptor 27, and/or device family 51 of FIG. 1, which may be stored by storage devices 908. Computing device 900, in one example, also includes one or more user interface devices 910. User interface devices 910, in some examples, are configured to receive input from a user through tactile, audio, or video feedback. Examples of user interface devices(s) 910 include a presence-sensitive display, a mouse, a keyboard, a voice responsive system, video camera, microphone or any other type of device for detecting a command from a user. In some examples, a presence-sensitive display includes a touch-sensitive screen.

One or more output devices 912 may also be included in computing device 900. Output device 912, in some examples, is configured to provide output to a user using tactile, audio, or video stimuli. Output device 912, in one example, includes a presence-sensitive display, a sound card, a video graphics adapter card, or any other type of device for converting a signal into an appropriate form understandable to humans or machines. Additional examples of output device 912 include a speaker, a cathode ray tube (CRT) monitor, a liquid crystal display (LCD), or any other type of device that can generate intelligible output to a user.

Computing device 900 may include operating system 916. Operating system 916, in some examples, controls the operation of components of computing device 900. For example, operating system 916, in one example, facilitates the communication of one or more applications with processors 902, communication unit 906, storage device 908, input device 904, user interface devices 910, and output device 912.

NFV orchestrator 930 includes a device profile engine 924 of VIM director 932 for execution by processors 902 to efficiently configure and instantiate VNFs to different types of NFVI, according to techniques described above. For example, NFV orchestrator 930 may receive a network service descriptor (NSD) for a network service from communication units 906, wherein the NSD includes a VNFD that describes a VNF and the VNFD includes data that indicates a device family for the VNF. NFV orchestrator 930 may determine an NFVI architecture to host the VNF, wherein the NFVI architecture is associated with a VIM-type key. NFV orchestrator 930 may obtain, based on the VNFD, an executable package for the VNF from device profile engine 934.

NFV orchestrator 930 may identify, based on the device family and VIM-type key, a device profile 936 for the VNF. NFV orchestrator 930 obtains, based on the device profile 936 for the VNF, configuration data for the executable package for the VNF from device profile engine 934. For example, each of device profiles 936 includes configuration data and/or defines one or more workflows for obtaining configuration data for configuring a particular type of VNF. For example, a device profile 936 may include bootstrap configuration information sufficient to resolve a bootstrap configuration for the VNF. For example, the bootstrap configuration information may include information sufficient to configure the VNF to accept network connections and communicate according to a particular networking protocol (e.g., SSH, HTTP, or HTTPS) with NFV orchestrator 930 for further run-time configurations. Further, the bootstrap configuration information may include an assignment of interfaces, VLANs, and MAC addresses for the VNF. Further, each device profile 936 may include traffic steering configuration information sufficient to resolve a traffic steering configuration for the VNF. For example, the traffic steering configuration information may specify interfaces, such as the attachment of an interface of the VNF instance to a physical port of a NIC, a management interface for the VNF instance, or a VLAN interface for the VNF instance. Further, each device profile 936 may provide one or more workflows that specify one or more APIs and microservices with which NFV orchestrator 930 may use to access device profiles 28 to resolve configuration information for the VNF.

NFV orchestrator 930 may configure, based on the configuration data, an instance of the executable package for the VNF to execute by the network function virtualization infrastructure as part of the network service. NFV orchestrator 930, VIM director 932, and device profile engine 934, may perform other processes or sets of operations described in this disclosure.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
   receiving, by at least one controller device for a network function virtualization infrastructure, a network service descriptor (NSD) for a network service, the NSD comprising a virtualized network function descriptor (VNFD) that describes a virtualized network function (VNF) and indicates a device family for the VNF;
   obtaining, by the at least one controller device, a virtualized infrastructure manager (VIM)-type of a VIM for managing the VNF;
   identifying, by the at least one controller device and based at least in part on the device family for the VNF and the VIM-type, a device profile that defines one or more workflows;
   executing the one or more workflows to obtain configuration data for configuring an instance of an executable package for the VNF; and
   configuring, by the at least one controller device and with the configuration data, the instance of the executable package for the VNF for execution by the network function virtualization infrastructure as part of the network service.

2. The method of claim 1,
   wherein executing the one or more workflows comprises executing the one or more workflows to obtain bootstrap configuration data, and
   wherein the configuration data for configuring the instance of the executable package for the VNF comprises the bootstrap configuration data.

3. The method of claim 1,
   wherein executing the one or more workflows comprises executing the one or more workflows to obtain traffic steering configuration data, and
   wherein the configuration data for configuring the instance of the executable package for the VNF comprises the traffic steering configuration data.

4. The method of claim 1,
   wherein executing the one or more workflows comprises executing the one or more workflows to obtain bootstrap configuration data and traffic steering configuration data, and
   wherein the configuration data for configuring the instance of the executable package for the VNF comprises the bootstrap configuration data and the traffic steering configuration data.

5. The method of claim 1,
   wherein the device profile that defines the one or more workflows further defines one or more statically-defined configuration parameters, and
   wherein the configuration data for configuring the instance of the executable package for the VNF comprises the statically-defined configuration parameters.

6. The method of claim 1, wherein executing the one or more workflows comprises:
   identifying, based on execution of the one or more workflows, one or more Application-Programming Interfaces (APIs) or microservices; and
   invoking the one or more APIs or microservices to resolve the configuration data for configuring the instance of the executable package for the VNF.

7. The method of claim 1,
   wherein the device profile that defines the one or more workflows further defines one or more configuration templates and one or more configuration parameters, and
   wherein executing the one or more workflows comprises:
      executing the one or more workflows to resolve the one or more configuration parameters to obtain values for the one or more configuration parameters;
      completing the one or more configuration templates with the values for the one or more configuration parameters to generate one or more completed configuration templates; and
      obtaining, from the one or more completed configuration templates, the configuration data for configuring the instance of the executable package for the VNF.

8. The method of claim 1, wherein the VIM-type indicates a type of network function virtualization architecture.

9. The method of claim 1, wherein the device family for the VNF comprises a plurality of VNFs of different types that have a common architecture with one another and at least one common configuration parameter in common with one another.

10. The method of claim 9, wherein the configuration data comprises configuration data for each of the at least one common configuration parameter.

11. At least one controller device for a network function virtualization infrastructure, the at least one controller device comprising one or more processors operably coupled to a memory and configured to:
   receive a network service descriptor (NSD) for a network service, the NSD comprising a virtualized network function descriptor (VNFD) that describes a virtualized network function (VNF) and indicates a device family for the VNF;
   obtain a virtualized infrastructure manager (VIM)-type of a VIM for managing the VNF;
   identify, based at least in part on the device family for the VNF and the VIM-type, a device profile that defines one or more workflows;

execute the one or more workflows to obtain configuration data for configuring an instance of an executable package for the VNF; and configure, with the configuration data, the instance of the executable package for the VNF for execution by the network function virtualization infrastructure as part of the network service.

12. The at least one controller device of claim 11,
wherein to execute the one or more workflows, the at least one controller device is configured to execute the one or more workflows to obtain bootstrap configuration data, and
wherein the configuration data for configuring the instance of the executable package for the VNF comprises the bootstrap configuration data.

13. The at least one controller device of claim 11,
wherein to execute the one or more workflows, the at least one controller device is configured to execute the one or more workflows to obtain traffic steering configuration data, and
wherein the configuration data for configuring the instance of the executable package for the VNF comprises the traffic steering configuration data.

14. The at least one controller device of claim 11,
wherein to execute the one or more workflows, the at least one controller device is configured to execute the one or more workflows to obtain bootstrap configuration data and traffic steering configuration data, and
wherein the configuration data for configuring the instance of the executable package for the VNF comprises the bootstrap configuration data and the traffic steering configuration data.

15. The at least one controller device of claim 11,
wherein the device profile that defines the one or more workflows further defines one or more statically-defined configuration parameters, and
wherein the configuration data for configuring the instance of the executable package for the VNF comprises the statically-defined configuration parameters.

16. The at least one controller device of claim 11, wherein to execute the one or more workflows, the at least one controller device is configured to:
identify, based on execution of the one or more workflows, one or more Application-Programming Interfaces (APIs) or microservices; and
invoke the one or more APIs or microservices to resolve the configuration data for configuring the instance of the executable package for the VNF.

17. The at least one controller device of claim 11,
wherein the device profile that defines the one or more workflows further defines one or more configuration templates and one or more configuration parameters, and
wherein to execute the one or more workflows, the at least one controller device is configured to:
execute the one or more workflows to resolve the one or more configuration parameters to obtain values for the one or more configuration parameters;
complete the one or more configuration templates with the values for the one or more configuration parameters to generate one or more completed configuration templates; and
obtain, from the one or more completed configuration templates, the configuration data for configuring the instance of the executable package for the VNF.

18. The at least one controller device of claim 11, wherein the VIM-type indicates a type of network function virtualization architecture.

19. The at least one controller device of claim 11, wherein the device family for the VNF comprises a plurality of VNFs of different types that have a common architecture with one another and at least one common configuration parameter in common with one another.

20. A non-transitory computer-readable storage medium comprising instructions that, when executed, cause one or more processors executing at least one controller device for a network function virtualization infrastructure to:
receive a network service descriptor (NSD) for a network service, the NSD comprising a virtualized network function descriptor (VNFD) that describes a virtualized network function (VNF) and indicates a device family for the VNF;
obtain a virtualized infrastructure manager (VIM)-type of a VIM for managing the VNF;
identify, based at least in part on the device family for the VNF and the VIM-type, a device profile that defines one or more workflows;
execute the one or more workflows to obtain configuration data for configuring an instance of an executable package for the VNF; and
configure, with the configuration data, the instance of the executable package for the VNF for execution by the network function virtualization infrastructure as part of the network service.

* * * * *